(12) United States Patent
Beck et al.

(10) Patent No.: US 9,212,729 B2
(45) Date of Patent: Dec. 15, 2015

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/410,729

(22) PCT Filed: May 14, 2013

(86) PCT No.: PCT/EP2013/059879
§ 371 (c)(1),
(2) Date: Dec. 23, 2014

(87) PCT Pub. No.: WO2014/000943
PCT Pub. Date: Jan. 3, 2014

(65) Prior Publication Data
US 2015/0184725 A1 Jul. 2, 2015

(30) Foreign Application Priority Data
Jun. 26, 2012 (DE) .......................... 10 2012 210 864

(51) Int. Cl.
*F16H 3/66* (2006.01)
*F16H 3/44* (2006.01)

(52) U.S. Cl.
CPC .......... *F16H 3/666* (2013.01); *F16H 2003/447* (2013.01); *F16H 2200/0065* (2013.01);
(Continued)

(58) Field of Classification Search
CPC ................ F16H 2200/0065; F16H 2200/2012; F16H 2200/2046; F16H 2200/2097; F16H 2003/447
See application file for complete search history.

(56) References Cited

U.S. PATENT DOCUMENTS 7,695,398 B2   4/2010   Phillips et al.
8,529,394 B2 *  9/2013   Gumpoltsberger ....... F16H 3/66
                                                    475/276

(Continued)

FOREIGN PATENT DOCUMENTS

DE           10162888 A1    7/2003
DE     10 2009 019046 A1   11/2010
(Continued)

OTHER PUBLICATIONS

ZF Friedrichshafen AG, International Patent Application PCT/EP2013/059879/; International Search Report and Written Opinion; dated Jan. 3, 2014.
(Continued)

*Primary Examiner* — Derek D Knight
(74) *Attorney, Agent, or Firm* — Dority & Manning, P.A.

(57) ABSTRACT

Multi-speed transmission comprising four planetary gear sets, eight rotatable shafts and six shifting elements, the sun gear of the first planetary gear set is connected to the third shaft, which is selectively coupleable or detachably connectable to the input shaft through a first clutch and is attachable to the transmission housing through a first brake, whereas the input shaft is, through a second clutch, selectively coupleable or detachably connectable to the fourth shaft connected to the bar of the third planetary gear set, which is attachable to the bar of the first planetary gear set through a second brake, which is coupled to the transmission housing, whereas the input shaft is connected to the sun gear of the fourth planetary gear set, whereas the eighth shaft is connected to the ring gear of the first planetary gear set, the sun gear of the second planetary gear set and the sun gear of the third planetary gear set, and the fifth shaft is connected to the bar of the second planetary gear set, the ring gear of the third planetary gear set and the ring gear of the fourth planetary gear set, whereas the sixth shaft is connected to the ring gear of the second planetary gear set and is, through a fourth clutch, selectively coupleable or detachably connectable to the output shaft of the transmission, which is, through a third clutch, selectively coupleable or detachably connectable to the seventh shaft connected to the bar of the fourth planetary gear set.

12 Claims, 2 Drawing Sheets

(52) U.S. Cl.
CPC . *F16H2200/0069* (2013.01); *F16H 2200/2012* (2013.01); *F16H 2200/2046* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 8,556,768 B2* | 10/2013 | Park | F16H 3/663 475/278 |
| 8,727,929 B2* | 5/2014 | Beck | F16H 3/666 475/280 |
| 9,039,562 B2* | 5/2015 | Beck | F16H 3/66 475/275 |
| 2011/0009228 A1 | 1/2011 | Bauknecht et al. | |
| 2013/0274060 A1* | 10/2013 | Beck | F16H 3/666 475/276 |
| 2015/0080168 A1* | 3/2015 | Beck | F16H 3/66 475/278 |
| 2015/0184723 A1* | 7/2015 | Beck | F16H 3/666 475/275 |

FOREIGN PATENT DOCUMENTS

| | | |
|---|---|---|
| DE | 10 2009 054105 A1 | 5/2011 |
| JP | 2006 349153 A | 12/2006 |

OTHER PUBLICATIONS

ZF Friedrichshafen AG, German Patent Application No. DE 2012 10 210864; Search Report; dated Feb. 1, 2013.

* cited by examiner

| Gear | Engaged Shifting Elements | | | | | | Ratio | Step |
|---|---|---|---|---|---|---|---|---|
| | Brake | | Clutch | | | | | |
| | 03 | 04 | 17 | 14 | 13 | 26 | i | φ |
| 1 |  | X | X |  | X |  | 5,086 | 1,518 |
| 2 | X | X | X |  |  |  | 3,350 | 1,509 |
| 3 |  | X | X |  |  | X | 2,220 | 1,450 |
| 4 | X |  | X |  |  | X | 1,531 | 1,208 |
| 5 |  |  | X |  | X | X | 1,267 | 1,267 |
| 6 |  |  | X | X |  | X | 1,000 | 1,157 |
| 7 |  |  | X | X | X |  | 0,864 | 1,269 |
| 8 |  |  |  | X | X | X | 0,681 | 1,205 |
| 9 | X |  |  | X |  | X | 0,565 | Total |
| R |  | X |  |  | X | X | -3,310 | 9,002 |

| Z1 | X |  | X | X |  |  | 0,794 |

Fig. 2

MULTI-SPEED GEARBOX

FIELD OF INVENTION

The present invention relates to a multi-speed transmission in planetary design, in particular an automatic transmission for a motor vehicle.

BACKGROUND

According to the state of the art, automatic transmissions, in particular for motor vehicles, include planetary gear sets that are shifted by means of friction elements or shifting elements and are typically connected to a start-up element that is subject to a slip effect and is alternatively provided with a lock-up clutch, such as a hydrodynamic torque converter or a fluid coupling.

In general, automatically shiftable vehicle transmissions of planetary design are subject to continuous development and improvement. Thus, such transmissions should require low construction costs, in particular a small number of shifting elements, and, upon a sequential shifting operation, should avoid double gearshifts, i.e. the switching on and off of two shifting elements, such that, during gearshifts in defined gear groups, only one shifting element is changed.

A multi-speed transmission of planetary design is known from DE 10 2008 000 428 A1 of the applicant; this features an input and an output, which are arranged in a housing. With the known transmission, at least four planetary gear sets, hereinafter referred to as the first, second, third and fourth planetary gear sets, at least eight rotatable shafts—hereinafter referred to as the input shaft, output shaft, third, fourth, fifth, sixth, seventh and eighth shaft—along with at least six shifting elements, comprising brakes and couplings, are provided; their selective actuation brings about different transmission ratio relationships between the input and the output, such that, preferably, nine forward gears and one reverse gear are able to be realized.

Thereby, the first and the second planetary gear sets, which are preferably formed as negative planetary gear sets, thus with a negative stationary transmission ratio, form a shiftable upstream gear set, whereas the third and the fourth planetary gear sets form a main gear set.

According to the state of the art, the shifting elements of the multi-stage transmissions designed in such a manner, which are typically designed as multi-disk couplings or brakes, are hydraulically actuated, which leads to high hydraulic losses in a disadvantageous manner. In order to avoid these actuating losses, the use of alternatively actuatable shifting elements, for example electromechanically actuatable shifting elements, would be particularly advantageous.

In order to enable the use of actuatable shifting elements in line with demand, the shifting elements, in particular the couplings, must be easily accessible from the outside.

SUMMARY OF THE INVENTION

The present invention is directed to a multi-speed transmission of the aforementioned type, which features nine forward gears and one reverse gear. The multi-speed transmission may have a sufficient transmission ratio, for which the construction costs, the component load and the component size are optimized, and which also improves efficiency regarding the drag losses and gearing losses. Moreover, the shifting elements of the transmission are to be easily accessible from the outside, by which the installation of actuatable shifting elements in line with demand is facilitated. In addition, the transmission is suitable for both standard design and a front-transverse design. Additional objectives and advantages of the invention set will be set forth in part in the following description, or may be obvious from the description, or may be learned through practice of the invention.

Accordingly, a multi-speed transmission in planetary design in accordance with an exemplary embodiment of the invention is proposed, which features an input and an output, which are arranged in a transmission housing. Furthermore, at least four planetary gear sets, hereafter referred to as the first, second, third and fourth planetary gear sets, eight rotatable shafts—hereinafter referred to as the input shaft, output shaft, third, fourth, fifth, sixth, seventh and eighth shafts—along with six shifting elements preferably designed as multi-disk shifting elements or as positive-locking shifting elements, including brakes and clutches, are provided; their selective actuation brings about different transmission ratio relationships between the input and the output, such that, preferably, at least nine forward gears and one reverse gear are able to be realized.

The first planetary gear set of the transmission is preferably designed as a positive planetary gear set, whereas the second, third, and fourth planetary gear sets of the transmission are preferably formed as negative planetary gear sets.

A simple negative planetary gear set comprises a sun gear, a ring gear and a carder or bar, on which the planetary gears are rotatably mounted, each of which meshes with the sun gear and the ring gear. Thereby, when the bar is held down, the ring gear exhibits a direction of rotation opposite to the sun gear, and a negative stationary transmission ratio arises. By contrast, a simple positive planetary gear set comprises a sun gear, a ring gear and a carder or bar, on which the inner and outer planetary gears are rotatably mounted, whereas all inner planetary gears mesh with the sun gear, and all outer planetary gears mesh with the ring gear, whereas each inner planetary gear meshes with each outer planetary gear. Thereby, when the bar is held down, the ring gear exhibits the same direction of rotation as the sun gear, and a positive stationary transmission ratio arises.

In accordance with exemplary aspects of the invention, the sun gear of the first planetary gear set is connected to the third shaft, which is selectively coupleable or detachably connectable to the input shaft through a first clutch and is attachable to the transmission housing through a first brake, whereas the input shaft is, through a second clutch, selectively coupleable or detachably connectable to the fourth shaft connected to the bar of the third planetary gear set, which is attachable to the bar of the first planetary gear set through a second brake, which is coupled to the transmission housing.

Furthermore, the input shaft is connected to the sun gear of the fourth planetary gear set, whereas the eighth shaft is connected to the ring gear of the first planetary gear set, the sun gear of the second planetary gear set and the sun gear of the third planetary gear set, and the fifth shaft is connected to the bar of the second planetary gear set, the ring gear of the third planetary gear set and the ring gear of the fourth planetary gear set.

In addition, the sixth shaft is connected to the ring gear of the second planetary gear set and is, through a fourth clutch, selectively coupleable or detachably connectable to the output shaft of the transmission, which is, through a third clutch, selectively coupleable or detachably connectable to the seventh shaft connected to the bar of the fourth planetary gear set.

By the fact that the first and second clutches are arranged on the input shaft of the transmission, and the third and fourth clutches are arranged on the output shaft, the remaining shifting elements are designed as brakes, the easy accessibility of essentially all shifting elements of the transmission is ensured, by which the shifting elements can be designed as actuatable shifting elements in line with demand.

Furthermore, transmission ratios particularly suitable for passenger cars along with an increased overall spread of the multi-speed transmission arise, which results in an improvement in driving comfort and a significant reduction in consumption.

Moreover, with the multi-speed transmission in accordance with the invention, construction costs are significantly reduced, due to the low number of shifting elements. In an advantageous manner, with the multi-speed transmission in accordance with the invention, it is possible to perform a start with a hydrodynamic converter, an external starting clutch or other suitable external start-up elements. It is also possible to facilitate the start-up procedure with a start-up element integrated into the transmission. A shifting element that is actuated in the first forward gear and in the reverse gear is preferably suitable.

Furthermore, the multi-speed transmission in accordance with the invention gives rise to good efficiency in the main driving gears, based on the low drag losses and gearing losses.

In an advantageous manner, there are low torques on the shifting elements and on the planetary gear sets of the multi-speed transmission, which reduces the load for the multi-speed transmission in an advantageous manner. In addition, the low torques enable correspondingly low dimensioning, which reduces the required installation space and the corresponding costs. Furthermore, there are also low rotational speeds for the shafts, the shifting elements and the planetary gear sets.

In addition, the transmission in accordance with the invention is designed in such a manner that adaptability to the various drive train arrangements is enabled, both in the direction of the power flow and in spatial terms.

BRIEF DESCRIPTION OF THE DRAWINGS

In the following, the invention is more specifically illustrated as an example on the basis of the attached figures. The following are represented in these:

FIG. 2: an exemplary circuit diagram for a multi-speed transmission in accordance with FIG. 1.

DETAILED DESCRIPTION

Figure 1:
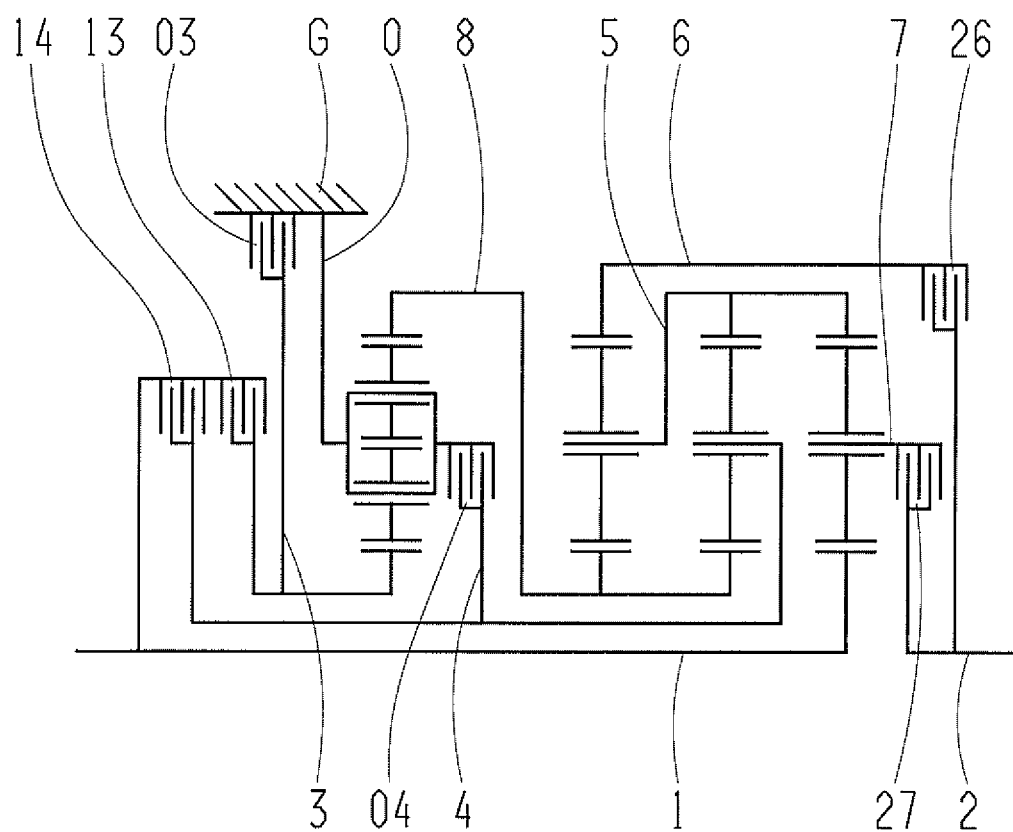
FIG. 1: a schematic view of a preferred embodiment of a multi-speed transmission in accordance with the invention.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a multi-speed transmission in accordance with an exemplary embodiment of the invention with an input shaft 1, an output shaft 2 and four planetary gear sets P1, P2, P3 and P4, which are arranged in a transmission housing G. In the example shown in FIG. 1, the planetary gear set P1 is formed as a positive planetary gear set, whereas the second, third and fourth planetary gear sets P2, P3, P4 are formed as negative planetary gear sets. In accordance with the invention, at least one of the negative planetary gear sets P2, P3, P4 may be designed as a positive planetary gear set, if, at the same time, the bar connection and the ring gear connection are exchanged, and the amount of the stationary transmission ratio is increased by one compared to the design as a negative planetary gear set.

With the embodiment that is shown, the planetary gear sets P1, P2, P3, P4 are arranged, viewed axially, in the order of the first planetary gear set P1, the second planetary gear set P2, the third planetary gear set P3, the fourth planetary gear set P4. In accordance with the invention, the axial order of the individual planetary gear sets and the arrangement of the shifting elements are freely selectable, as long as this allows for the binding ability of the elements of the planetary gear sets.

As shown in FIG. 1, six shifting elements, namely two brakes 03, 04 and four clutches 13, 14, 26, 27, are provided. The spatial arrangement of the shifting elements may be arbitrary, and is limited only by the dimensions and the external shaping. The clutches and brakes of the transmission are preferably designed as frictional shifting elements or multi-disk shifting elements, but may also be designed as positive-locking shifting elements.

With these shifting elements, a selective shifting of nine forward gears and one reverse gear can be realized. The multi-speed transmission in accordance with the invention features a total of eight rotatable shafts, namely the shafts 1, 2, 3, 4, 5, 6, 7 and 8, where the input shaft forms the first shaft 1 and the output shaft forms the second shaft 2 of the transmission.

In accordance with the invention, with the multi-speed transmission in accordance with FIG. 1, it is provided that the sun gear of the first planetary gear set P1 is connected to the third shaft 3, which is selectively coupleable or detachably connectable to the input shaft 1 through a first clutch 13 and is attachable to the transmission housing G through a first brake 03, whereas the input shaft 1 is, through a second clutch 14, selectively coupleable or detachably connectable to the fourth shaft 4 connected to the bar of the third planetary gear set P3, which is coupleable or attachable to the bar of the first planetary gear set P1 through a second brake 04, which is coupled to the transmission housing G (via shaft 0).

With reference to FIG. 1, the input shaft 1 is connected to the sun gear of the fourth planetary gear set P4, whereas the eighth shaft 8 is connected to the ring gear of the first planetary gear set P1, the sun gear of the second planetary gear set P2 and the sun gear of the third planetary gear set P3; the fifth shaft 5 is connected to the bar of the second planetary gear set P2, the ring gear of the third planetary gear set P3 and the ring gear of the fourth planetary gear set P4.

Furthermore, the sixth shaft 6 of the transmission is connected to the ring gear of the second planetary gear set P2 and, through a fourth clutch 26, is selectively coupleable or detachably connectable to the output shaft 2 of the transmission, which is, through a third clutch 27, selectively coupleable or detachably connectable to the seventh shaft 7 connected to the bar of the fourth planetary gear set P4.

With the embodiment that is shown, the second brake 04 is particularly suitable for a design as a claw shifting element, by which consumption is significantly improved.

FIG. 2 shows an exemplary circuit diagram of a multi-speed transmission in accordance with FIG. 1. For each gear, three shifting elements are closed. As an example, the respective transmission ratios i of the individual gears and the gear steps or progressive steps p, to be determined from these, for the next higher gear can be seen in the circuit diagram, whereas the value 9.002 represents the spread of the transmission.

For the example shown, the values for the stationary transmission ratios of the first, second, third and fourth planetary gear sets P1, P2, P3, P4 are 2.550, 3.425, −2.700 and −2.350, respectively. FIG. 2 shows that, upon a sequential shifting operation, only one shifting element must be switched on, and only one shifting element must be switched off, since two adjacent gears jointly use two shifting elements. It also shows that a large spread is achieved with small gear steps.

The first forward gear arises from the locking of the second brake 04 and the first and third clutches 13, 27, the second forward gear arises from the locking of the first and second brakes 03, 04 and the third clutch 27, the third forward gear arises from the locking of the second brake 04 and the third and fourth clutches 27, 26, the fourth forward gear arises from the locking of the first brake 03 and the third and fourth clutches 27, 26, the fifth forward gear arises from the locking of the first, third, and fourth clutches 13, 27, 26, the sixth forward gear, which in the example shown is designed as a direct gear, arises from the locking of the second, third and fourth clutches 14, 27, 26, the seventh forward gear arises from the locking of the first, second and third clutches 13, 14, 27, the eighth forward gear arises from the locking of the first, second fourth clutches 13, 14, 26 and the ninth forward gear arises from the locking of the first brake 03 and the second and fourth clutches 14, 26, whereas the reverse gear arises from the locking of the second brake 04 and the first and fourth clutches 13, 26.

As an addition to the nine forward gears, an additional gear Z1 can be realized through the locking of the first brake 03 and the second and third clutches 14, 27; the transmission ratio of this is between the transmission ratios of the seventh and the eighth forward gears.

By the fact that, in the first forward gear and in the reverse gear, the second brake 04 and the first clutch 13 are closed, these shifting elements may be used as start-up elements.

In accordance with the invention, even with the same transmission scheme, different gear steps arise depending on the shifting logic, such that an application-specific or vehicle-specific variation is enabled.

In accordance with the invention, it is also optionally possible to provide additional freewheels at each suitable location of the multi-speed transmission, for example between one shaft and the transmission housing, or, if applicable, in order to connect two shafts.

An axle differential and/or a distributor differential may be arranged on the input side or on the output side.

Within the framework of an advantageous additional exemplary form of the invention, if necessary, the input shaft 1 may be separated from the drive motor by a coupling element, whereas a hydrodynamic converter, a hydraulic clutch, a dry starting clutch, a wet starting clutch, a magnetic powder clutch or a centrifugal clutch may be used as the coupling element. It is also possible to arrange such a start-up element in the direction of the power flow behind the transmission, whereas, in this case, the input shaft 1 is constantly connected to the crankshaft of the drive motor.

The multi-speed transmission in accordance with the invention also allows for the arrangement of a torsional vibration damper between the drive motor and the transmission.

Within the framework of an additional exemplary embodiment of the invention that is not shown, a wear-free brake, such as a hydraulic retarder or an electric retarder or the like, may be arranged at each shaft, preferably at the input shaft 1 or the output shaft 2; this is of particular importance for use in commercial vehicles. Furthermore, a power take-off may be provided for the drive of additional power units at each shaft, preferably at the input shaft 1 or the output shaft 2.

The frictional shifting elements that are used may be formed as power-shiftable clutches or brakes. In particular, force-fitting clutches or brakes, such as multi-disk clutches, band brakes and/or cone couplings, may be used.

An additional advantage of the multi-speed transmission presented here is that an electric motor can be installed at each shaft as a generator and/or as an additional drive motor.

Modifications and variations can be made to the embodiments illustrated or described herein without departing from the scope and spirit of the invention as set forth in the appended claims.

REFERENCE SIGNS

0 Shaft
1 First shaft, input shaft
2 Second shaft, output shaft
3 Third shaft
4 Fourth shaft
5 Fifth shaft
6 Sixth shaft
7 Seventh shaft
8 Eighth shaft
03 Eighth shaft
04 Second brake
13 First clutch
14 Second clutch
26 Fourth clutch
27 Third clutch
G Transmission housing
P1 First planetary gear set
P2 Second planetary gear set
P3 Third planetary gear set
P4 Fourth planetary gear set
i Transmission ratio
ϕ Progressive step

The invention claimed is:

1. An automatic transmission, comprising:
a transmission housing;
a plurality of planetary gear sets having a first planetary gear set, a second planetary gear set, a third planetary gear set and a fourth planetary gear set, a carrier of the first planetary gear set coupled to the transmission housing; and
a plurality of rotatable shafts having an input shaft, an output shaft, a third shaft, a fourth shaft, a fifth shaft, a sixth shaft, a seventh shaft and an eight shaft, the input shaft connected to a sun gear of the fourth planetary gear set, the third shaft connected to a sun gear of the first planetary gear set, the fourth shaft connected to a carrier of the third planetary gear set, the fifth shaft connected to a carrier of the second planetary gear set, a ring gear of the third planetary gear set and a ring gear of the fourth planetary gear set, the sixth shaft connected to a ring gear of the second planetary gear set, the seventh shaft connected to a carrier of the fourth planetary gear set, the eighth shaft connected to a ring gear of the first planetary gear set, a sun gear of the second planetary gear set and a sun gear of the third planetary gear set; and
a plurality of shifting elements having a first brake, a second brake, a first clutch, a second clutch, a third clutch and a fourth clutch, the first brake configured for selectively coupling the third shaft to the transmission housing, the second brake configured for selectively coupling the carrier of the first planetary gear set to the fourth shaft, the first clutch configured for selectively coupling the input shaft to the third shaft, the second clutch configured for selectively coupling the input shaft to the fourth shaft, the third clutch configured for selectively coupling the output shaft to the seventh shaft, the fourth clutch configured for selectively coupling the output shaft to the sixth shaft.

2. The automatic transmission of claim 1, wherein the first planetary gear set is a positive planetary gear set and the second, third and fourth planetary gear sets are negative planetary gear sets.

3. The automatic transmission of claim 1, wherein the first planetary gear set, the second planetary gear set, the third planetary gear set and the fourth planetary gear set are arranged axially within the transmission housing in a sequence corresponding to the first planetary gear set, the second planetary gear set, the third planetary gear set and the fourth planetary gear set.

4. The automatic transmission of claim 1, wherein the second brake is a positive-locking shifting element.

5. The automatic transmission of claim 1, wherein the first brake, the first clutch, the second clutch, the third clutch and the fourth clutch are each multi-disc friction shifting elements.

6. The automatic transmission of claim 1, wherein the automatic transmission has at least nine forward gears and one reverse gear, the second brake and the first and third clutches closed in a first forward gear of the nine forward gears, the first and second brakes and the third clutch closed in a second forward gear of the nine forward gears, the second brake and the third and fourth clutches closed in a third forward gear of the nine forward gears, the first brake and the third and fourth clutches closed in a fourth forward gear of the nine forward gears, the first, third and fourth clutches closed in a fifth forward gear of the nine forward gears, the second, third and fourth clutches closed in a sixth forward gear of the nine forward gears, the first, second and third clutches closed in a seventh forward gear of the nine forward gears, the first, second and fourth clutches closed in a eighth forward gear of the nine forward gears, the first brake and the second and fourth clutches closed in a ninth forward gear of the nine forward gears.

7. An automatic transmission, comprising:
a transmission housing;
a plurality of rotatable shafts positioned within the transmission housing, the plurality of rotatable shafts including an input shaft, an output shaft, a third shaft, a fourth shaft, a fifth shaft, a sixth shaft, a seventh shaft and an eight shaft;
a plurality of planetary gear sets positioned within the transmission housing, the plurality of planetary gear sets including a first planetary gear set, a second planetary gear set, a third planetary gear set and a fourth planetary gear set,
a carrier of the first planetary gear set connected to the transmission housing,
a sun gear of the fourth planetary gear set coupled to the input shaft,
a sun gear of the first planetary gear set coupled to the third shaft,
a carrier of the third planetary gear set coupled to the fourth shaft,
a carrier of the second planetary gear set, a ring gear of the third planetary gear set and a ring gear of the fourth planetary gear set coupled to the fifth shaft,
a ring gear of the second planetary gear set coupled to the sixth shaft,
a carrier of the fourth planetary gear set coupled to the seventh shaft, and
a ring gear of the first planetary gear set, a sun gear of the second planetary gear set and a sun gear of the third planetary gear set coupled to the eighth shaft; and
a plurality of shifting elements positioned within the transmission housing, the plurality of shifting elements including a first brake, a second brake, a first clutch, a second clutch, a third clutch and a fourth clutch,
the first brake configured such that the third shaft is coupleable to the transmission housing with the first brake,
the second brake configured such that the carrier of the first planetary gear set is coupleable to the fourth shaft with the second brake,
the first clutch configured such that the input shaft is coupleable to the third shaft with the first clutch,
the second clutch configured such that the input shaft is coupleable to the fourth shaft with the second clutch,
the third clutch configured such that the output shaft is coupleable to the seventh shaft with the third clutch, and
the fourth clutch configured such that the output shaft is coupleable to the sixth shaft with the fourth clutch.

8. The automatic transmission of claim 7, wherein the first planetary gear set is a positive planetary gear set and the second, third and fourth planetary gear sets are negative planetary gear sets.

9. The automatic transmission of claim 7, wherein the first planetary gear set, the second planetary gear set, the third planetary gear set and the fourth planetary gear set are arranged axially within the transmission housing in a sequence corresponding to the first planetary gear set, the second planetary gear set, the third planetary gear set and the fourth planetary gear set.

10. The automatic transmission of claim 7, wherein the second brake is a positive-locking shifting element.

11. The automatic transmission of claim 7, wherein the first brake, the first clutch, the second clutch, the third clutch and the fourth clutch are each multi-disc friction shifting elements.

12. The automatic transmission of claim 7, wherein the automatic transmission has at least nine forward gears and one reverse gear, the second brake and the first and third clutches dosed in a first forward gear of the nine forward gears, the first and second brakes and the third clutch dosed in a second forward gear of the nine forward gears, the second brake and the third and fourth clutches dosed in a third forward gear of the nine forward gears, the first brake and the third and fourth clutches dosed in a fourth forward gear of the nine forward gears, the first, third and fourth clutches closed in a fifth forward gear of the nine forward gears, the second, third and fourth clutches closed in a sixth forward gear of the nine forward gears, the first, second and third clutches closed in a seventh forward gear of the nine forward gears, the first, second and fourth clutches closed in a eighth forward gear of the nine forward gears, the first brake and the second and fourth clutches closed in a ninth forward gear of the nine forward gears.

* * * * *